Feb. 6, 1940.   I. J. BENJAMIN   2,189,238
SAMPLING DIPPER
Filed May 23, 1938
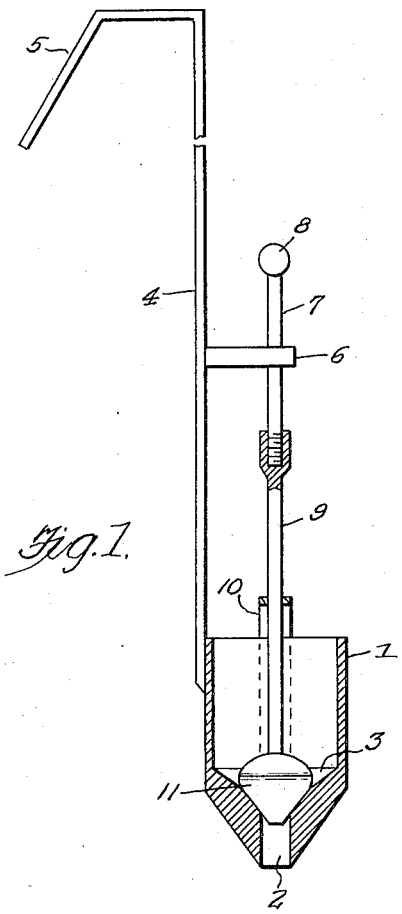
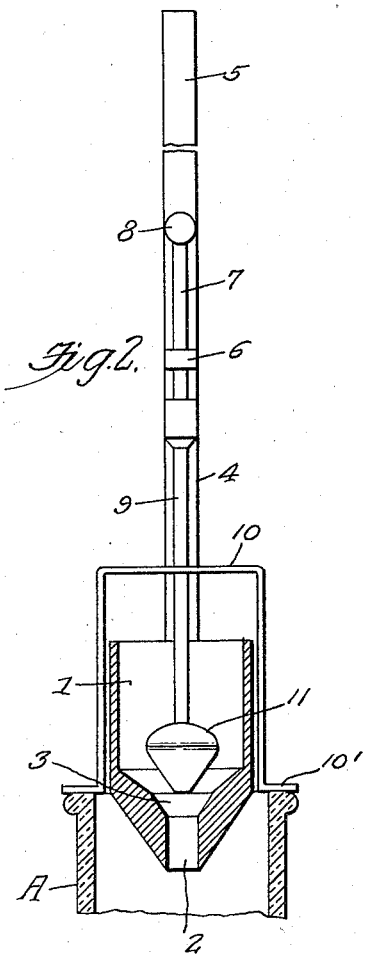
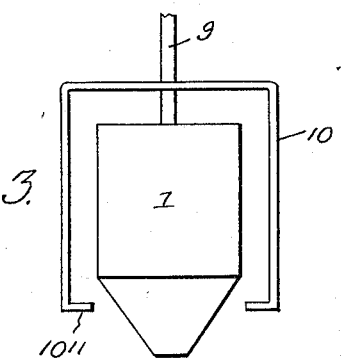
Inventor
Israel J. Benjamin.
By Clarence A. O'Brien
and Hyman Berman
Attorneys Patented Feb. 6, 1940

2,189,238

UNITED STATES PATENT OFFICE 2,189,238

SAMPLING DIPPER

Israel J. Benjamin, Lisbon, N. Y.

Application May 23, 1938, Serial No. 209,593

3 Claims. (Cl. 137—18)

This invention relates to a sampling dipper, mainly designed for taking samples of milk for butter fat and bacteria tests through which, of course, can be used for other purposes.

The general object of the invention is to provide means whereby the device can be placed in the bottom of a can of milk to take a sample of the milk and then removed with a portion of the milk therein, after which the device is placed over a sample tube or bottle and by pressure of a portion of the bottle against a portion of the device a valve will be opened to permit the sample to run into the bottle. This avoids contamination of the milk as the operator's hands do not come into contact with any portion of the device excepting the handle part.

Of course the sample can be taken any place below the surface of the liquid.

This invention also consists in certain other features of construction and in the combination and arrangement of the several parts to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which—

Figure 1 is an elevation with parts in section of the invention.

Figure 2 is a front view with the container in section and also showing the device as moved to valve open position by the bottle which is shown in dotted lines.

Figure 3 is a fragmentary front view showing a slight modification.

In the drawing the numeral 1 indicates a cup which is preferably of cylindrical shape and having its lower end of conical shape, and said lower end having a port 2 therein the bottom of the cup sloping downwardly and inwardly to the port as shown at 3. An elongated handle member 4 is connected at one end to the cup and the upper end of the handle member is bent into hook shape as shown at 5 so that it can be readily gripped by the user or placed over the edge of a can or the like. A horizontally arranged guide member 6 is connected with an intermediate part of the handle and extends over the cup and acts as a guide for the stem 7 having a ball 8 at its upper end. The lower end of the stem 7 is threaded into a socket at the upper end of a valve stem 9 which has an inverted yoke 10 connected to an intermediate part thereof, the limbs of the yoke extending downwardly alongside of the cup. A valve head 11 is connected with the lower end of the stem 9 and normally engages the part 3 to close the port 2 under the weight of the part. The lower ends of the limbs of the yoke may be bent outwardly as shown at 10' or they may be bent inwardly as shown at 10'' in Figure 3.

In using the device for taking a sample of milk from the bottom of a can of milk, for instance, the handle is grasped and the device inserted in the can until the cup 1 reaches a point adjacent the bottom thereof. Of course, as the cup is inserted into the milk in the can this milk will fill the cup and is held therein by the valve 11 engaging the seat forming part 3. Then the device is removed from the can and placed over a bottle A or other container for receiving the sample of the milk, as shown in Figure 2. As the device is placed over the bottle the turned ends 10' will come in contact with the top of the bottle so that further downward movement of the yoke 10 of the valve part will cease and the weight of the other part will move the cup downwardly so as to open the valve to permit the sample to flow from the cup into the bottle.

Of course, the modification shown in Figure 3 is used in the same manner, the ends 10'' of this modified form of the invention engaging the upper end of a container for the sample.

Thus it will be seen that samples can be taken from containers without danger of contaminating the contents of the container as the cup and the parts associated therewith are not touched by the hand or any other article in removing a sample from a container and discharging the sample into another container.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. A milk sampling dipper comprising a cup-shaped receptacle having only a top filler opening and a bottom valve opening, a handle extending upwardly from said receptacle, a valve member extending into the top filler opening and bodily removable therethrough for closing said valve opening, an operating member connected with said valve member and extending beyond the exterior periphery of said receptacle and downwardly along the outside of said receptacle for bearing against the edge of the mouth of a container into which the contents of said dipper is to be poured.

2. A milk sampling dipper comprising a cup-shaped receptacle having only a top filler opening and a bottom valve opening, an elongated handle extending upwardly from said receptacle, a valve member extending into the top filler opening and bodily removable therethrough for closing said valve opening, said valve member extending upwardly along said handle and being detachably and slidably secured thereto, an operating member connected with said valve member and extending beyond the exterior periphery of said receptacle and downwardly along the outside of said receptacle for bearing against the edge of the mouth of a container into which the contents of said dipper is to be poured.

3. A milk sampling dipper comprising a cup-shaped receptacle having only a top filler opening and a bottom valve opening, an elongated handle extending upwardly from said receptacle, a valve member extending into the top filler opening and bodily removable therethrough for closing said valve opening, said valve member including an elongated element extending upwardly along said handle and slidably supported by said handle, said element including a detachable coupling at a point below said slidable support, an operating member connected with said valve member and extending beyond the exterior periphery of said receptacle and downwardly along the outside of said receptacle for bearing against the edge of the mouth of a container into which the contents of said dipper is to be poured.

ISRAEL J. BENJAMIN.